No. 617,866. Patented Jan. 17, 1899.
C. SOMASCO.
APPARATUS FOR KNEADING DOUGH.
(Application filed Nov. 26, 1897.)
(No Model.) 3 Sheets—Sheet 1.
FIG-1.
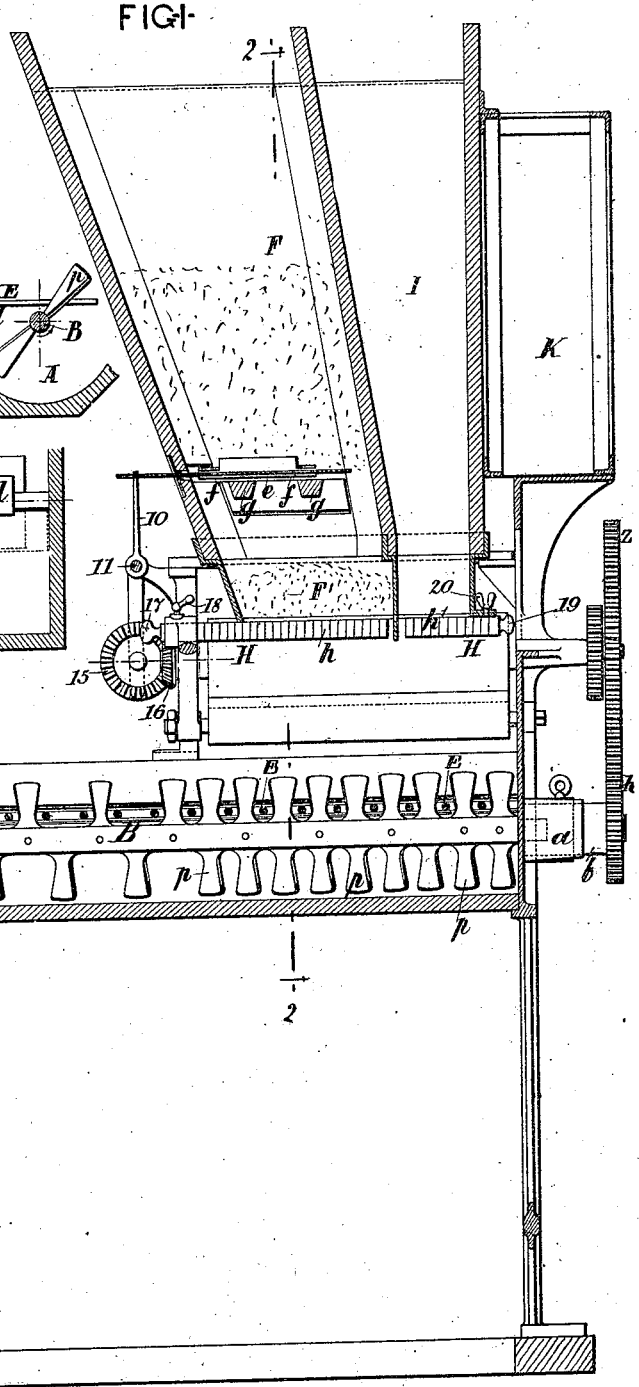
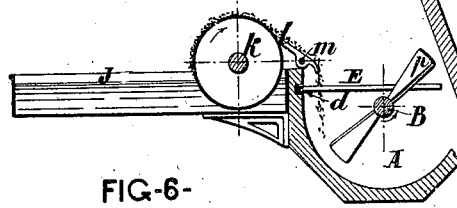
FIG-5.
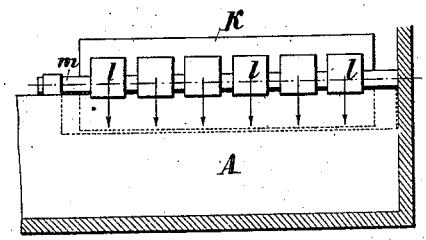
FIG-6.
WITNESSES: Fred White, T. F. Wallack
INVENTOR: Charles Somasco,
By his Attorneys:

No. 617,866. Patented Jan. 17, 1899.
C. SOMASCO.
APPARATUS FOR KNEADING DOUGH.
(Application filed Nov. 26, 1897.)
(No Model.) 3 Sheets—Sheet 2.
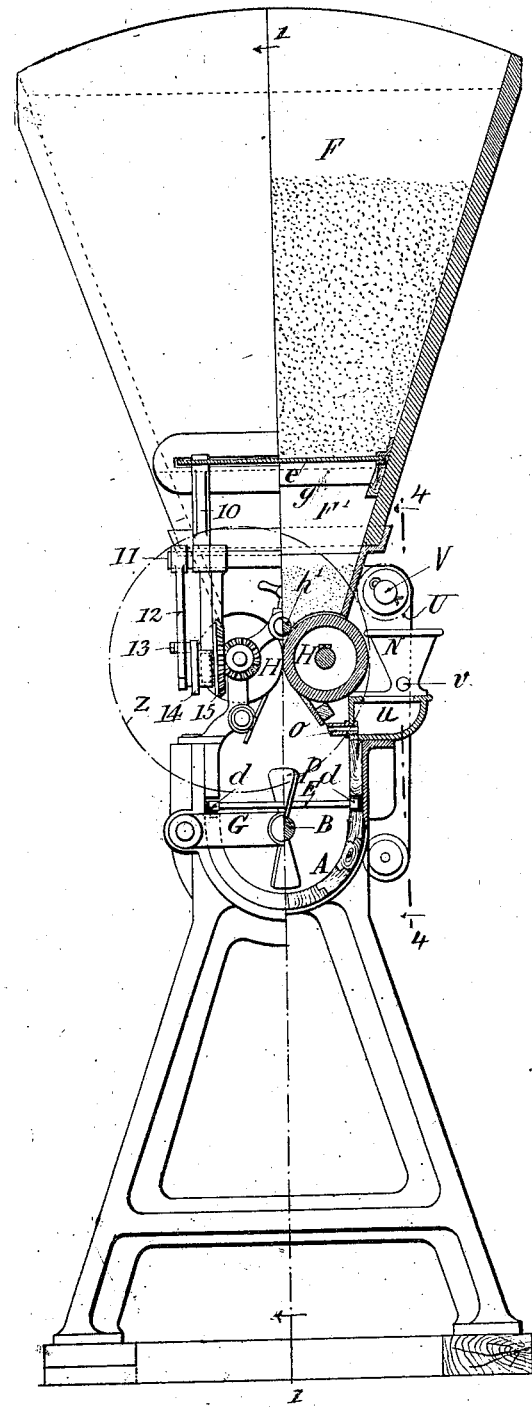
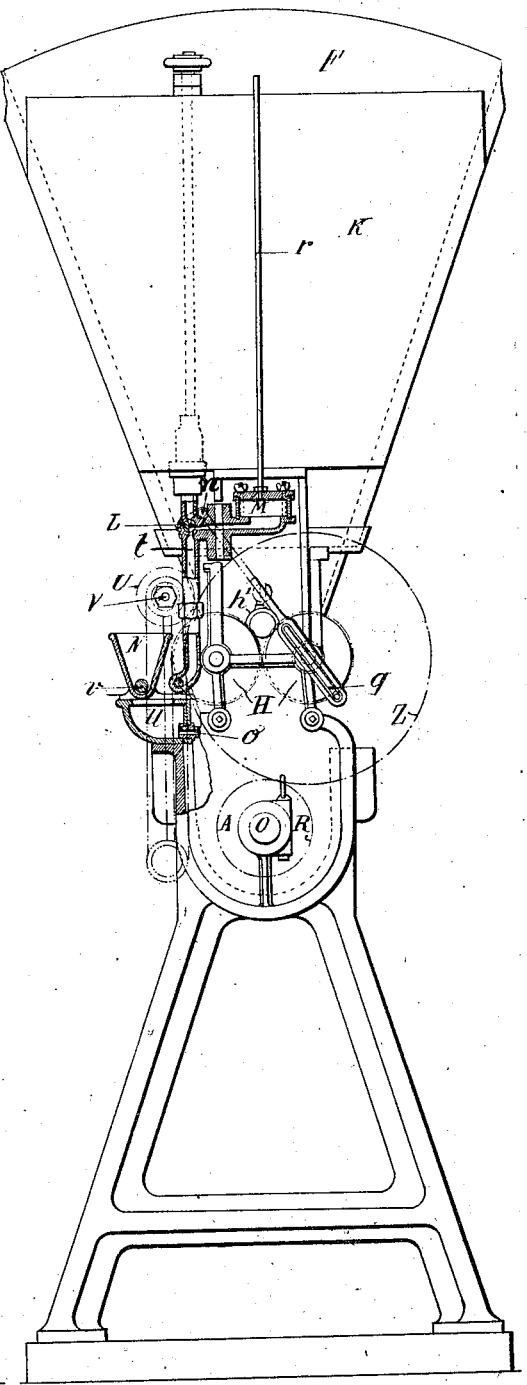
WITNESSES:
Fred White
T. F. Wallace
INVENTOR:
Charles Somasco,
By his Attorneys

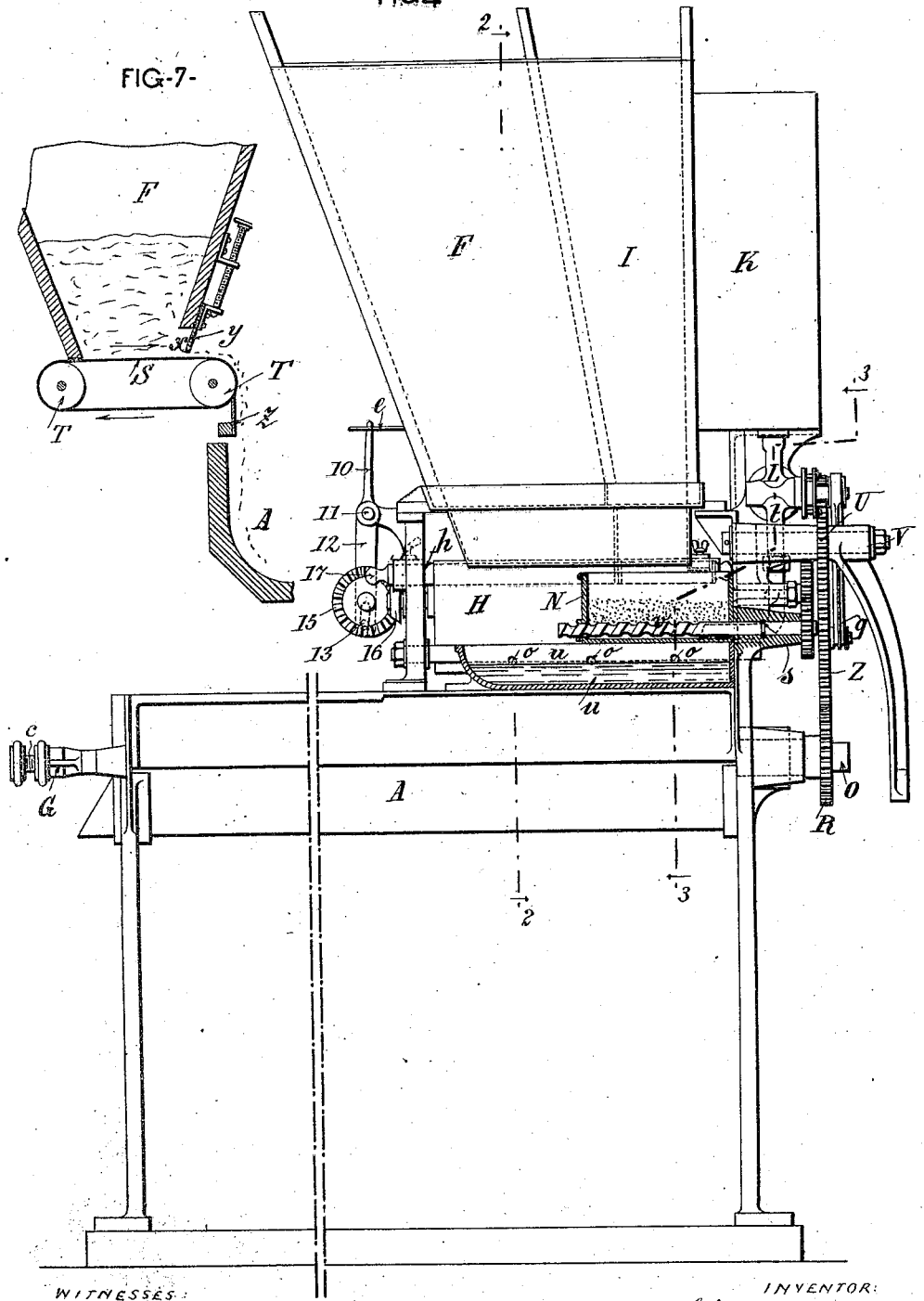

UNITED STATES PATENT OFFICE.

CHARLES SOMASCO, OF CREIL, FRANCE.

APPARATUS FOR KNEADING DOUGH.

SPECIFICATION forming part of Letters Patent No. 617,866, dated January 17, 1899.

Application filed November 26, 1897. Serial No. 659,929. (No model.)

*To all whom it may concern:*

Be it known that I, CHARLES SOMASCO, a citizen of the Republic of France, residing in Creil, (Oise,) France, have invented certain new and useful Improvements in Apparatus for Kneading Dough, (the same being the subject-matter of Letters Patent in Great Britain, No. 18,544, dated August 10, 1897; in Belgium, No. 100,489, dated August 21, 1897; in Switzerland, No. 15,217, dated August 27, 1897; in France, No. 269,463, dated August 9, 1897; in Italy, No. 33/45,660, 90/418, dated August 28, 1897; in Hungary, No. 10,661, dated August 26, 1897, and in Austria, No. 47/3,729, dated August 24, 1897,) of which the following is a specification.

My invention relates to an improved construction of mechanical kneading apparatus wherein the materials for forming the dough are continuously fed in at one end and the kneaded dough is continuously discharged at the other end and provides certain improvements therein, which will be hereinafter fully set forth.

I will describe my present improvements with reference to the accompanying drawings, in which—

Figure 1 is a longitudinal vertical section on line 1 1 in Fig. 2. Fig. 2 is a front end view, partly in vertical section, on the line 2 2 in Figs. 1 and 4. Fig. 3 is a back end view, partly in vertical section, on the line 3 3 in Fig. 4. Fig. 4 is a side view, partly in vertical section, on the line 4 4 in Fig. 2. Figs. 5, 6, and 7 show modified constructions of the feeding devices, Figs. 5 and 6 being, respectively, fragmentary vertical longitudinal and cross sections of one modification and Fig. 7 being a fragmentary vertical longitudinal section of another.

In the drawings, A is a kneading-trough. B is a blade-shaft therein, having kneading-blades $p$. E is a grating between the blades. V is the driving-shaft. R, Z, and U are toothed wheels. G is a bridge-piece. F is a flour-hopper. $e$ is a movable valve or partition therein. $f$ are openings in valve $e$. F' is a smaller hopper. H are flour-feeding rollers. $h$ is a regulating-bar thereover. I is a leaven-hopper. $h'$ is a sliding regulating-bar. J is a vessel for liquid leaven. $k$ is a feed-roller therein. $l$ are scrapers therefor. K is a water-reservoir. L is a three way cock therefor. $n$ is a crank. $q$ is a slotted rod therefor. M is a gage vessel. $r$ is its air-pipe. $t$ is a water-pipe leading from said three-way cock or conducting water to reservoir $u$ and thence to the trough A. N is a salt-receptacle. $v$ is a screw-feed therein. $w$ is a salt and water reservoir. $o$ are outlets therefrom to the trough A. S is a belt conveyer. T are its rollers. $x$ is a feed-opening. $y$ is a sliding door therefor, and $z$ is a scraper for the belt.

The kneading apparatus consists of a semi-cylindrical trough A of comparatively small dimensions—say a trough capable of producing one hundred and forty hundred-weights of dough daily—having only about nine and one-half inches diameter and thirty-eight inches length. Within this trough is a longitudinal shaft B, of metal or hard wood, provided with a number of blades $p$ $p$, proportioned to the work to be performed. These blades, of helical form, are inclined in the direction of the travel to be imparted to the dough during the rotation of the shaft. A horizontal grating E serves to prevent the rotary motion of the dough. It produces consequently at each revolution of the shaft a drawing out and aeration of the dough that is being kneaded. The blades $p$ pass between the bars of the grating, which constitute in some degree a screw-nut to the screw formed by the blades. By this means the kneading action is rendered very perfect.

The blades $p$ can be arranged uniformly along the whole length of the shaft if it be desired to obtain a maximum amount of kneading action. They may, on the other hand, be interrupted at certain points if a less complete kneading is required, so that the amount of work expended can be limited exactly to the desired degree of perfection to be obtained. In the arrangement shown the blades are placed nearer together at the part where the materials are fed in and are placed farther apart at the middle, while at the delivery end some of the blades are placed closer together again.

The blade-shaft has its one end $a$ formed square and fitted into a corresponding socket $b$, formed in the axis O of the driving-wheel R, so that the blade-shaft consequently has rotary motion imparted to it through the toothed wheels R, Z, and U from the driving-shaft V, which is rotated either by hand or by power. The other end of the blade-shaft is carried by an adjustable center pin c, carried by a transverse bridge-piece G, which latter is also removable for facilitating the dismounting and ready removal of the blade-shaft and grating when these require to be cleansed. For this purpose the grating slides in two grooves d formed in the sides of the trough A. This trough can consequently be readily emptied and cleansed.

To permit of sliding out the grating, the blades on the shaft are arranged to project to diametrically opposite sides, so that when the blades are turned horizontally they are entirely beneath the grating and the latter can be freely moved in its grooves.

All the ingredients required for forming the dough fall automatically into the apparatus at the right-hand end, and the dough, suitably kneaded, passes out of the other end of the trough.

The flour is placed in a hopper F, divided by a horizontal partition e into two compartments of unequal size. Into the upper space F, which is comparatively large, the flour is directly charged, while into the lower space F', which is considerably smaller, the flour falls intermittently from F in consequence of an alternating motion of the plate e, with grid-like openings f, which plate moves in grooves situated above fixed transverse supports g, which correspond with the said openings f in certain positions of the plate e. This plate is reciprocated from the outside of the hopper by arms 10 10, entering slots in the projecting portion of the plate, these arms being fixed on a rock-shaft 11, from which projects an arm 12, having a slot engaged by a crank-pin 13 on a disk 14, which is driven by a bevel-gear 15 from a gear 16, fixed on the journal of one of the rolls H. The flour in the upper compartment, which will vary in density according to the quantity charged therein, falls intermittently into the lower chamber F' through the plate e, and will there always be of the same density, as the chamber is never full. This body of flour is then fed uniformly by the feeding-rollers H H, which revolve in contrary directions. The quantity of flour is regulated by means of a movable round or flat bar h, which can be slid endwise to uncover more or less of the length of the rolls and is actuated from the outside by means of a handle 17 and can be set in any position by a set-screw 18.

When the manufacture of bread is carried on with the employment of leaven in the form of paste, whether such leaven is prepared separately or is produced in the preceding operations, it is placed in a hopper I, at the lower end of which extensions of the said two feeding-rollers H H cause the leaven to fall into the kneading-trough. A sliding regulating-bar h', movable endwise like the bar h and actuated from the exterior by a knob 19 and held by a set-screw 20, enables the opening between the rollers, and consequently the discharge of leaven, to be regulated. The bars h h' are shown in Fig. 1 slid in for almost their full length to almost entirely close the feed.

For certain manufactures the leaven used is of a liquid consistency. This is the case in particular for the manufacture of certain fancy breads. In this case the liquid leaven is placed in a vessel J of slight depth, as shown in the partial transverse section at Fig. 5 and in the fragmentary longitudinal section at Fig. 6, in which vessel is a roller k, rotated at a suitable speed and dipping into the liquid leaven, so that by its rotation it carries round an adhering layer of leaven, which is scraped off by a series of pivoted scrapers l, bearing against the roller k, the leaven thus separated being made to fall into the kneading-trough A.

The number of scrapers l, which are mounted on pivots m, can be varied so as to supply a greater or less quantity of leaven.

The necessary supply of water is led by any suitable known means into a reservoir K. It is previously heated to the required temperature or it may be heated in the vessel itself by any known means, such as a heated circulating-coil, a gas-burner, &c. Thence it is supplied by a three-way cock L, to the plug of which is imparted a reciprocating rotary motion by a crank n and slotted rod q, so that at each revolution of the wheel Z, gearing with the wheel V, the cock establishes a communication, on the one hand, between the gage vessel M and the reservoir K, and, on the other hand, between the gage vessel M and the pipe t, which supplies the water to the kneading-trough A.

The capacity of the gage vessel M, which is preferably partly of glass, can be varied by making it interchangeable.

An air-escape tube r enables the gage vessel to be readily filled.

The salt-supply is contained in a receptacle N, in the bottom of which is provided a screw-spindle v, by the rotation of which a regulated quantity of salt, dependent on the pitch of the screw and its speed of rotation, is discharged from the receptacle. The screw-spindle can be changed by withdrawing the pin s which holds it. The salt thus discharged falls into a small reservoir u, together with the water supplied from the distributing-cock L, through the tube t. The salt is dissolved in the water, and this then flows into the kneading-trough A through channels o at the place where the flour enters.

The drawings clearly show the manner in which motion is transmitted to the several parts of the apparatus.

When the flour employed is dry and of a pulverulent texture—such as that employed in Austria for making the bread called "*Kaiser brod,*" &c.—it may happen that it will run through between the rollers H without these being rotated. The regulation becomes in that case very difficult, as the supply no longer depends on the speed of rotation. In this case I employ the arrangement shown at Fig. 7. The flour-hopper F here has at its lower end an endless cloth S, stretched over two rollers T T. These rollers being rotated the cloth is made to travel and so carry with it the flour, which passes through the lateral opening $x$, the discharge being regulated by the adjustable slide $y$, sliding in grooves on the hoppers. The flour falls thence into the kneading-trough A, and a scraper $z$ separates the particles of flour that may adhere to the cloth. The latter may be of any woven fabric or of caoutchouc, &c. The two rollers can be mounted on movable bearings for regulating the tension of the cloth. Their rotation is effected through suitable gearing from the driving-gear of the apparatus. The horizontal partition $e$ with grid-like openings, previously described, may also be applied in the hopper F in this case.

What I claim is—

1. In an apparatus for kneading dough, the combination of a trough, a removable blade-shaft revolving therein having helical blades, and a removable grating mounted in said trough over said shaft, and formed with transverse bars coinciding with the spaces between the blades of said shaft, whereby said blades in revolving may move through the spaces between said bars and thereby propel the dough forward while subdividing, mixing and kneading it, and whereby by removing the grating and blade-shaft all the parts are accessible for cleaning.

2. In an apparatus for kneading dough, a kneading device consisting of a trough having receiving and discharge ends, a blade-shaft revolving therein, and a longitudinally-removable sliding grating held in ways in said trough, and having transverse bars between which the blades of said shaft work.

3. In an apparatus for kneading dough, a kneading device consisting of a trough having receiving and discharge ends, a blade-shaft revolving therein having helical blades projecting to diametrically opposite sides of said shaft, and a longitudinally-removable sliding grating held in ways in said trough and having transverse bars between which the blades of said shaft work, said grating and shaft being relatively arranged so that when the blades of the shaft are turned horizontally the grating is left free to be removed by sliding it out longitudinally over said shaft.

4. In an apparatus for kneading dough, the combination with a kneading device, of a hopper for supplying flour thereto composed of an upper compartment into which flour can be charged, and a lower compartment from whence it can be discharged in a uniform manner to said kneading device, and means between said compartments for intermittently feeding flour from the upper to the lower, whereby the flour in the lower compartment is maintained of uniform density regardless of the extent of the charge in the upper compartment.

5. In an apparatus for kneading dough, the combination with a kneading device of a hopper for containing flour, a hopper for containing leaven, arranged adjacent thereto, a feeding mechanism for delivering flour and leaven from said hoppers to the kneading device, and separate regulating means for controlling the feed of flour and leaven respectively by said mechanism.

6. In an apparatus for kneading dough, the combination with a kneading device of a hopper for containing flour, a hopper for containing leaven, arranged adjacent thereto, a pair of feed-rollers extending under both hoppers, for delivering flour and leaven from said hoppers to the kneading device, and separate regulating means for controlling the feed of flour and leaven respectively by said rollers.

7. In an apparatus for kneading dough, the combination with a kneading device of a hopper, a revolving feeder for transferring material from said hopper to said kneading device, and a regulating means for controlling the feed, consisting of a slide movable to uncover more or less of said feeder.

8. In an apparatus for kneading dough, the combination with a kneading device of a hopper, a pair of feed-rolls beneath said hopper, and a regulating-slide between said hopper and rolls, movable to uncover more or less of the length of said rolls.

9. In an apparatus for kneading dough, the combination with a kneading device of two hoppers for containing flour, a pair of feed-rolls extending beneath both said hoppers, and separate regulating means for controlling the feed from said hoppers respectively consisting of two slides arranged beneath the respective hoppers and over the rolls, said slides movable to uncover more or less of the length of said rolls.

10. In an apparatus for kneading dough, the combination of a kneading-trough, a blade-shaft turning therein, means for feeding flour to one end of said trough, a receptacle for liquid leaven adjacent to said end of the trough, a roller turning therein and taking up a layer of leaven on its surface, and a scraper arranged to scrape off said layer and drop it into said trough.

11. In apparatus for kneading dough the combination with a kneading device, of a water vessel, a gage vessel, a three-way cock therebetween, and means for moving said cock from the water vessel to the gage vessel, and from the gage vessel to the kneading device.

12. In apparatus for kneading dough, the combination with a kneading device, of a salt-reservoir, and a feed for discharging a regulated quantity of salt, a source of water-supply, a receptacle receiving salt from said feed and water from said source of supply, and outlets from said receptacle to said kneading device.

13. In apparatus for kneading dough, a kneading device, in combination with a receptacle N, a source of water-supply, a receptacle u receiving the discharge therefrom and from said receptacle N, and feeding it to the kneading device, and means for simultaneously feeding other ingredients to said device, and for continuously kneading the ingredients therein.

In witness whereof I have hereunto signed my name in the presence of two subscribing witnesses.

CHARLES SOMASCO.

Witnesses:
  A. JOVNECEN,
  LEPIRDT.